US010484317B2

(12) United States Patent
Jayaram et al.

(10) Patent No.: US 10,484,317 B2
(45) Date of Patent: Nov. 19, 2019

(54) TECHNIQUES FOR GENERATING MESSAGES TO ENTITIES REFERENCED IN A MESSAGING THREAD

(71) Applicant: Facebook, Inc., Menlo Park, CA (US)

(72) Inventors: Vinodh Jayaram, Fremont, CA (US); Jeremy Olivier Barre, San Francisco, CA (US); Andrew Cairns Moxon, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 265 days.

(21) Appl. No.: 15/434,887

(22) Filed: Feb. 16, 2017

(65) Prior Publication Data
US 2018/0234366 A1 Aug. 16, 2018

(51) Int. Cl.
H04L 12/58 (2006.01)

(52) U.S. Cl.
CPC ............. H04L 51/08 (2013.01); H04L 51/16 (2013.01)

(58) Field of Classification Search
CPC .................................. H04L 51/08; H04L 51/16
See application file for complete search history.

(56) References Cited

U.S. PATENT DOCUMENTS

| 2004/0137882 | A1 | 7/2004 | Forsyth | |
|---|---|---|---|---|
| 2009/0106695 | A1* | 4/2009 | Perry | G06F 17/24 715/816 |
| 2010/0262666 | A1 | 10/2010 | Kalu | |
| 2010/0293221 | A1 | 11/2010 | Sidman et al. | |
| 2014/0004889 | A1* | 1/2014 | Davis | H04W 4/12 455/466 |
| 2014/0055491 | A1 | 2/2014 | Malamud et al. | |
| 2014/0108370 | A1 | 4/2014 | Andri et al. | |
| 2015/0039442 | A1 | 2/2015 | Sidman | |
| 2015/0067724 | A1* | 3/2015 | Johnson | H04N 21/4668 725/32 |
| 2015/0178878 | A1* | 6/2015 | Huang | G06Q 50/34 705/26.7 |
| 2015/0286629 | A1 | 10/2015 | Abdel-Reheem et al. | |
| 2015/0334075 | A1 | 11/2015 | Wang et al. | |
| 2015/0350118 | A1* | 12/2015 | Yang | H04L 51/02 715/752 |
| 2016/0247213 | A1* | 8/2016 | Lee | G06Q 30/0617 |
| 2016/0359771 | A1* | 12/2016 | Sridhar | H04L 51/02 |
| 2017/0039296 | A1 | 2/2017 | Bastide et al. | |
| 2017/0097861 | A1* | 4/2017 | Claypool, III | G06F 11/079 |
| 2017/0131870 | A1 | 5/2017 | Harper | |
| 2017/0193037 | A1 | 7/2017 | Bhagwan et al. | |
| 2017/0222961 | A1 | 8/2017 | Beach et al. | |
| 2018/0191651 | A1 | 7/2018 | Goldberg et al. | |

* cited by examiner

Primary Examiner — Mohamed A. Wasel

(57) ABSTRACT

Techniques for generating messages to entities referenced in a messaging thread are described. In one embodiment, a method may receive a partial entity-reference invocation in a message thread; suggest one or more entity-reference invocations based on the partial entity-reference invocation; receive a user selection of one of the suggested entity-reference invocations; generate a message to the entity referenced in the selected entity-reference invocation; and send the message to the entity via a messaging system. Other embodiments are described and claimed.

15 Claims, 15 Drawing Sheets

US 10,484,317 B2

TECHNIQUES FOR GENERATING MESSAGES TO ENTITIES REFERENCED IN A MESSAGING THREAD

RELATED APPLICATIONS

This application is related to the U.S. patent application titled "TECHNIQUES FOR COMMUNICATING ENTITY REFERENCES IN A MESSAGING THREAD," Ser. No. 15/434,895, filed Feb. 16, 2017, which is hereby incorporated by reference in its entirety.

This application is also related to the U.S. patent application titled "TECHNIQUES FOR AUGMENTING ENTITY REFERENCES IN A MESSAGING SYSTEM," Ser. No. 15/434,904, filed Feb. 16, 2017, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for entity references in messaging groups. Some embodiments are particularly directed to techniques for generating, communicating, and augmenting entity references in messaging groups. In one embodiment, for example, an apparatus may comprise a user interface component operative to predict an entity-reference invocation in a message thread display on a client device; suggest one or more entities for use in the entity-reference invocation in response to predicting the entity-reference invocation; and receive the entity-reference invocation, the entity-reference invocation comprising an entity reference; and a client messaging component operative to generate a message comprising the entity reference; and send the message to a messaging system.

In another embodiment, for example, an apparatus may comprise a client messaging component operative to receive a message at a recipient client device from a messaging system, the recipient client device associated with a recipient user account, the message comprising an entity reference, the message addressed to a message thread; and extract an augmentation element for the entity reference from the message; and a user interface component operative to display the augmentation element in a message thread display for the message thread on the recipient client device.

In another embodiment, for example, an apparatus may comprise a messaging component operative to receive a message from a referencing client device at a messaging system, the message comprising an entity reference; determine a receiving user account for the message; and send an augmented entity reference to one or more receiving client devices associated with the receiving user account; and an entity reference component operative to select an augmentation element associated with the entity reference; and generate the augmented entity reference by augmenting the entity reference with the augmentation element.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
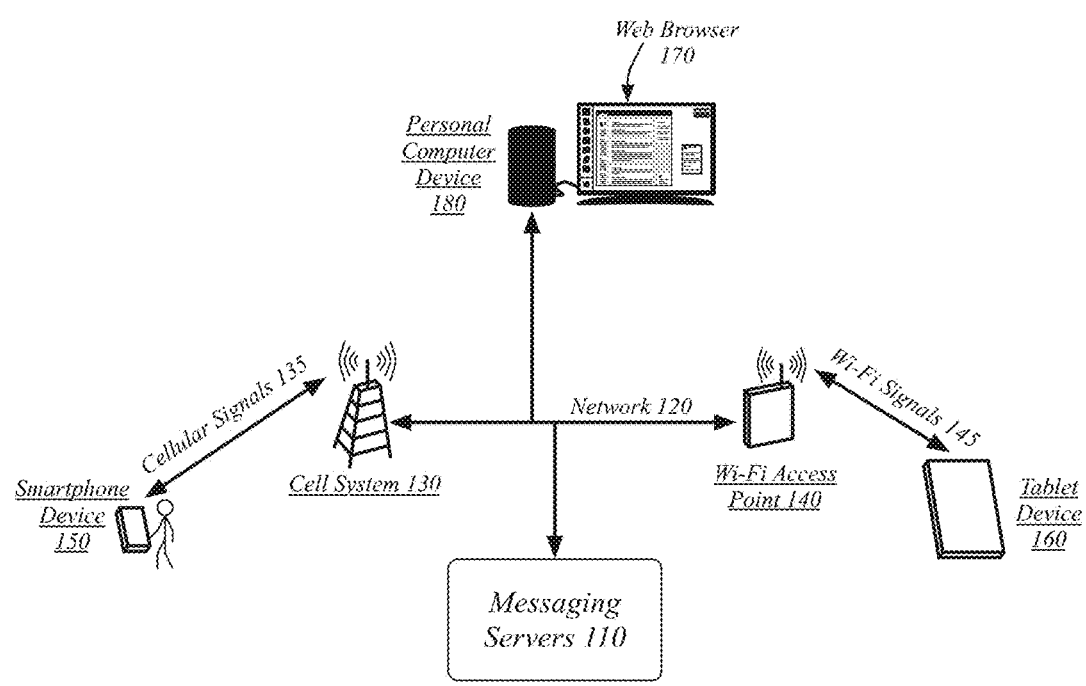
FIG. 1 illustrates an embodiment of an entity reference system.

Mentioning another user in a group messaging conversation may aid in getting that user's attention and calling them directly into the messaging and posting experience. Mentioning a user may be enhanced by providing a process through which users can select defined entities that they are mentioning. By establishing that something being mentioned in a message refers to a particular entity, the message may be augmented with various information and tools to enhance the experience of mentioning something and interacting with a message where something has been mentioned.

In some instances, a user may mention another user. The mentioned user may have their attention called to the mention. For example, the mentioned user may be sent a notification that they were mentioned, may be shown a preview of the mention in an inbox view, may be empowered to navigate to mentions of them within a message thread, and may have mentions of them be displayed distinctively to empower the visual recognition of their mentions. Either or both of the sending user and other non-mentioned viewing users may be shown information to help them understand who is being mentioned, information otherwise related to the mentioned, and/or controls empower various actions to be taken in relation to the mentioned.

Users may mention entities other than other users. For instance, users may mention media, products, businesses, people, locations, or other things. Any of these may be augmented with information and controls. As a result, users may receive an improved experience in mentioning users and other things on a messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a entity reference system 100. In one embodiment, the entity reference system 100 may comprise a computer-implemented system having software applications comprising one or more components. Although the entity reference system 100 shown in FIG. 1 has a limited number of elements in a certain topology, it may be appreciated that the entity reference system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. However, in other embodiments, while encrypted communication may be used between the client devices and server devices, the messaging server devices may be empowered to examine the contents of user messages. Such examination may be used to provide services to the users of the messaging system. In some embodiments, users may be empowered to select whether a particular message thread uses end-to-end encryption (and thereby receive the additional privacy of the messaging servers being prevented from examining the contents of messages) or doesn't (and thereby receive the benefit of the messaging system being able to programmatically examine messages and offer relevant services to the users).

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
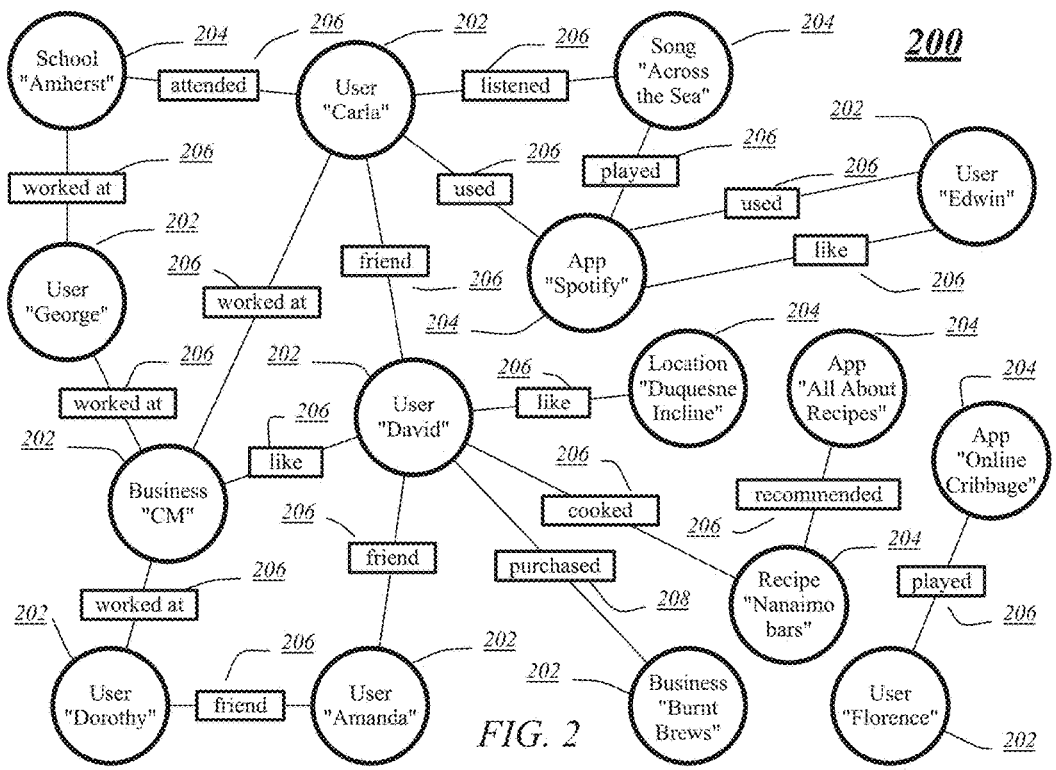
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other interactable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
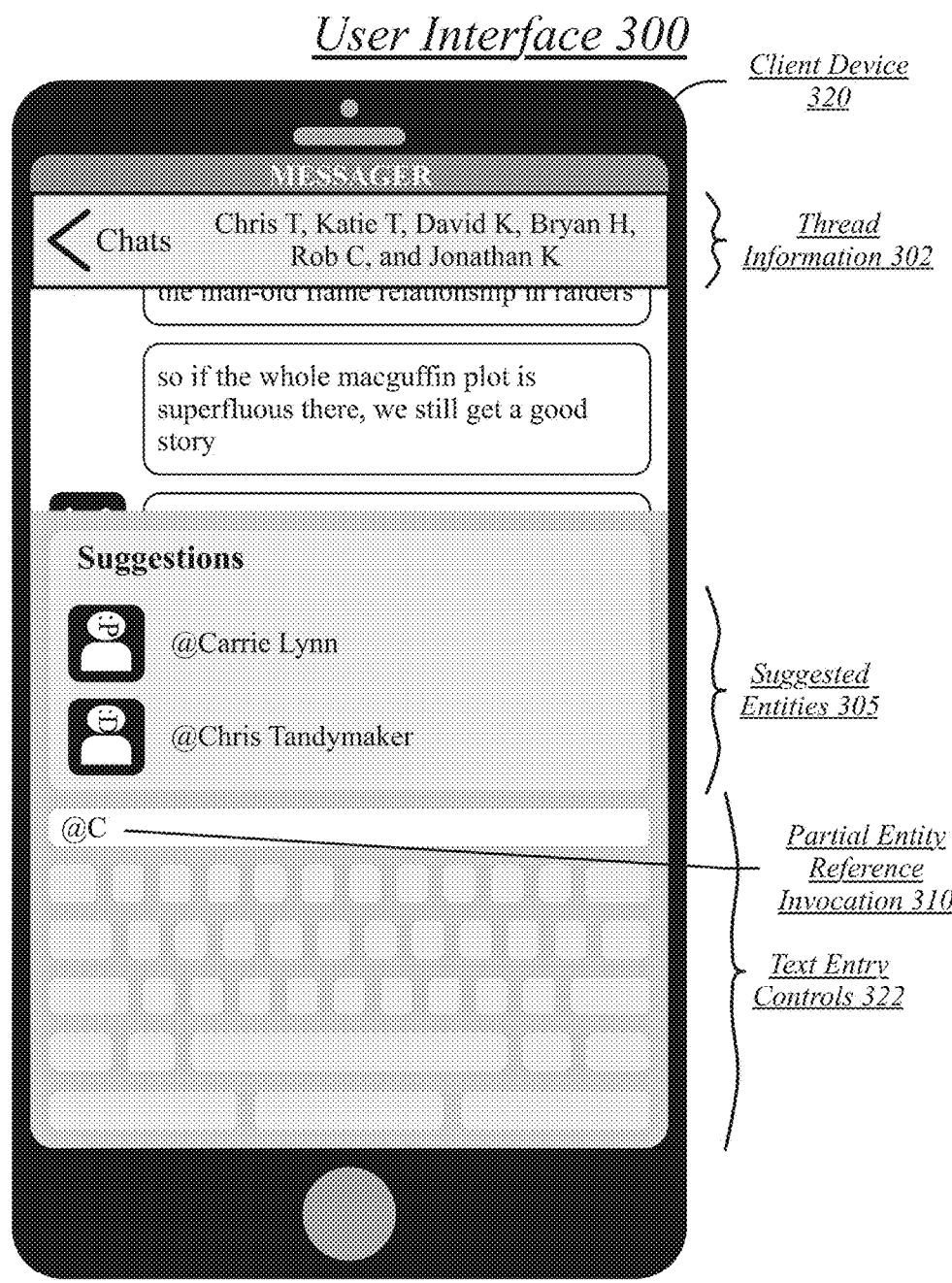
FIG. 3A illustrates an embodiment of a user interface with a partial entity reference invocation.

FIG. 3A illustrates an embodiment of a user interface 300 with a partial entity reference invocation 310.

A client device 320 may correspond to any device used to access an entity reference system 100. While in the illustrated embodiment of FIG. 3A the client device 320 resembles a smartphone device, it will be appreciated that the techniques described herein may be used with any type of device.

The user interface 300 may comprise a user interface for a message thread. At least a portion of the message exchange for the message thread may be displayed. In the illustrated embodiment, a portion of the message exchange display is obscured by the suggested entities 305. The features discussed with regards to a message thread may be applied to either one-on-one message threads or group message threads.

The user interface 300 may include a display of thread information 302. The thread information 302 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users. For a group message thread, the thread information 302 may indicate the plurality of people participating in the group message thread, or may indicate a portion of that plurality of people, such as where there are too many participants in the group message thread to display within space allotted for the thread information 302. In some cases, such as with a public group message thread, the thread information 302 may be a public name assigned to the public group message thread.

As part of a messaging interaction, the user of a client device 320 may mention an entity, such as another user. The user may enter a partial entity reference invocation 310 as part of entering text in a text-entry field. In the illustrated embodiment, the partial entity reference invocation 310 includes an entity-reference symbol, such as the at-sign '@'. An entity-reference symbol may indicate a user's desire to make an entity reference and may be used as a prefix to text identifying the entity for referencing, the entity to be referenced. However, in some embodiments, a reference to an entity by a user may be recognized without the use of the entity-reference symbol.

The entity reference system 100 detects, predicts, or otherwise determines that the user may be aided through the offering of suggested entities 305. The suggested entity 305 are one or more suggestions generated by the entity reference system 100 to aid the user in composing an entity reference. The suggested entities 305 may be determined based on the contents of the user's partial entity reference invocation 310, the context of the messaging conversation, and a history for the composing user, without limitation. In the illustrated embodiment, the user has entered an initial character—a "C"—for the entity-reference invocation, and in response the entity reference system 100 has suggested entities—in this case users—with names starting with that initial character.

The suggested entities 305 may comprise a plurality of suggested entity controls, with each of the plurality of suggested entity controls corresponding to a suggested entity of a plurality of suggested entities 305. A selected suggested entity control may empower a user to add a suggested entity reference associated with the selected suggested entity control.

In some cases, an entity reference may be created without the use of an entity-reference symbol. The entity reference system 100 may detect that a portion or all of a composition field corresponds to a partial or complete identifier for an entity, even without the use of an entity-reference symbol or other explicit indication that entered text corresponds to a known entity. An identifier may comprise, for example, a name for the entity. The entity reference system 100 may offer the user to include an entity reference based on the identification of the user mentioning an entity.

Figure 3B:
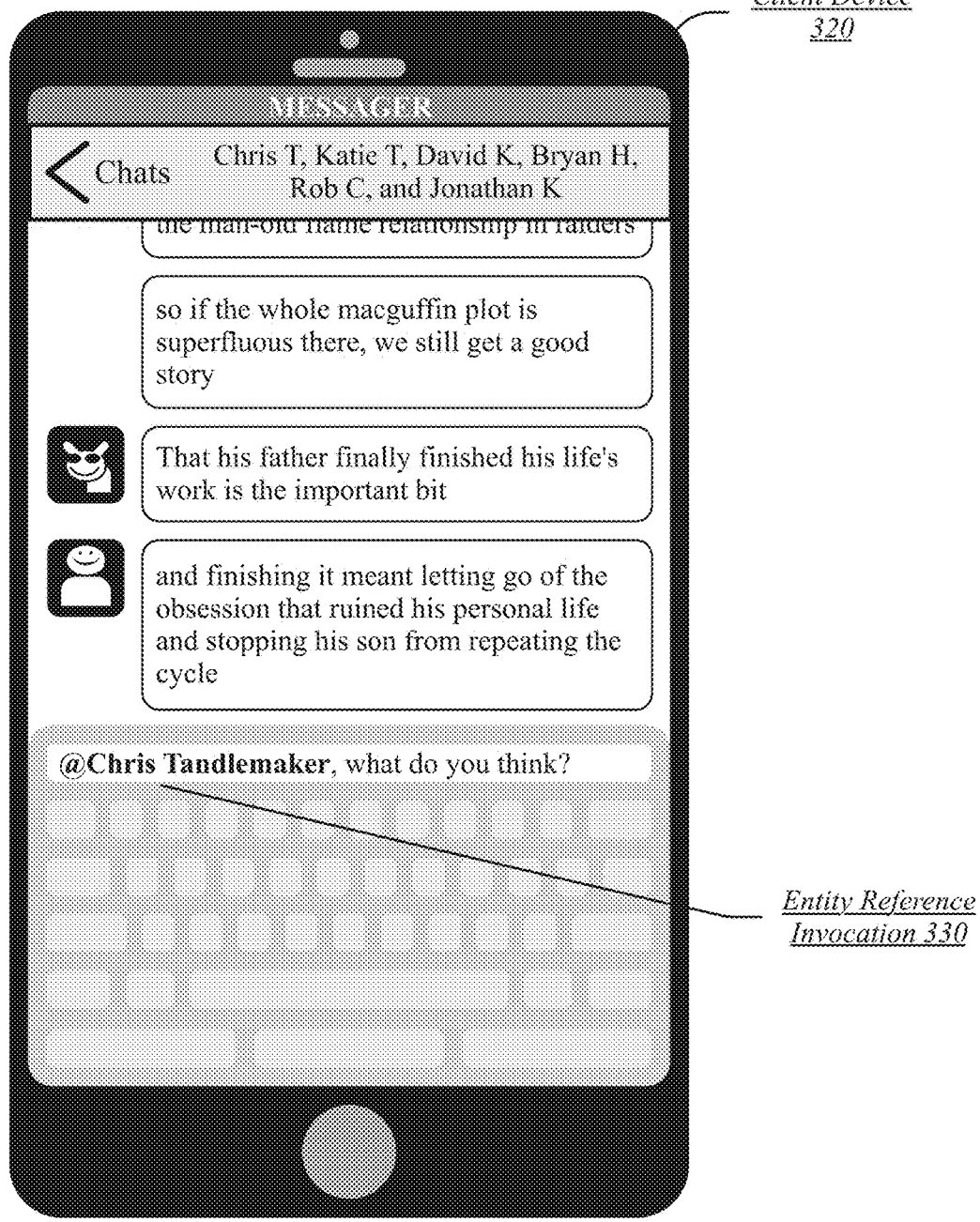
FIG. 3B illustrates an embodiment of a user interface with an entity reference invocation.

FIG. 3B illustrates an embodiment of a user interface 325 with an entity reference invocation 330. The entity reference invocation 330 is a recognized invocation of an entity reference. The entity reference invocation 330 may be visually indicated as having been recognized as an invocation of an entity reference, such as though the use of a particular visual style, which may include the use of a distinct color. The visual indication may be included in the text entry field to notify the user that their composition include an entity reference. The entity reference invocation 330 may have been added to the composition field of the messaging client in response to a user selecting a suggested entity from a display of a plurality of suggested entities 305.

Figure 4A:
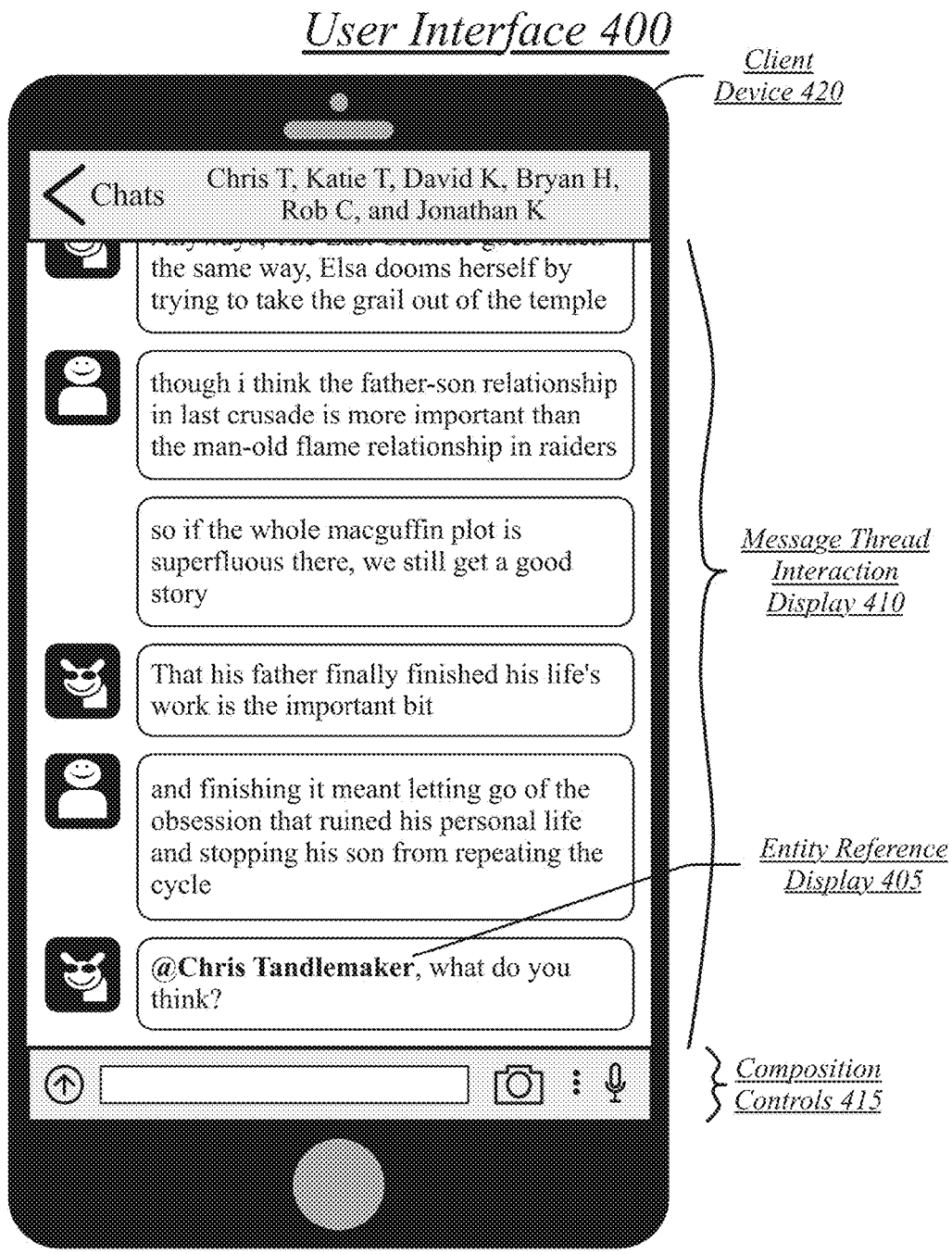
FIG. 4A illustrates an embodiment of a user interface with an entity reference display.

FIG. 4A illustrates an embodiment of a user interface 400 with an entity reference display 405.

The client device 420 may correspond to the same client device 320 as used to compose an entity reference or may correspond to another client device, such as may be used by a different participant in the message thread.

The user interface 400 for a message thread may include composition controls 415 that are persistently visible during the display of a message thread. Many, most, or nearly all of the composition controls 415 may empower access to further user interface controls for the performance of various tasks, such as text entry, media selection, emoji selection, camera use, a social approval icon, etc.

The user interface 400 may comprise a user interface for a message thread. At least a portion of the message exchange for the message thread may be displayed in a message thread interaction display 410. A message thread interaction display 410 may comprise a display of one or more messages exchanged by the users of the message thread. The features discussed with regards to a message thread may be applied to either one-on-one message threads or group message threads.

An entity reference display 405 is included in the message thread interaction display 410 when the entity reference is added to the message thread. The entity reference display 405 is a message display, one of a plurality of message displays that may be included in the message thread interaction display 410. The entity reference display 405 may include an entity-reference symbol to textually indicate that a portion of the text of the message comprising the entity reference is an entity reference. In some embodiments, the entity reference display 405 may include the entity-reference symbol even where the entity-reference symbol was not used by the composing user to invoke the creation of an entity reference, so as to textually communicate the existence of the entity reference. The entity reference may additionally or alternatively be communicated using other techniques in the entity reference display 405, such as by using a distinctive font, typeface, color, or other element.

Figure 4B:
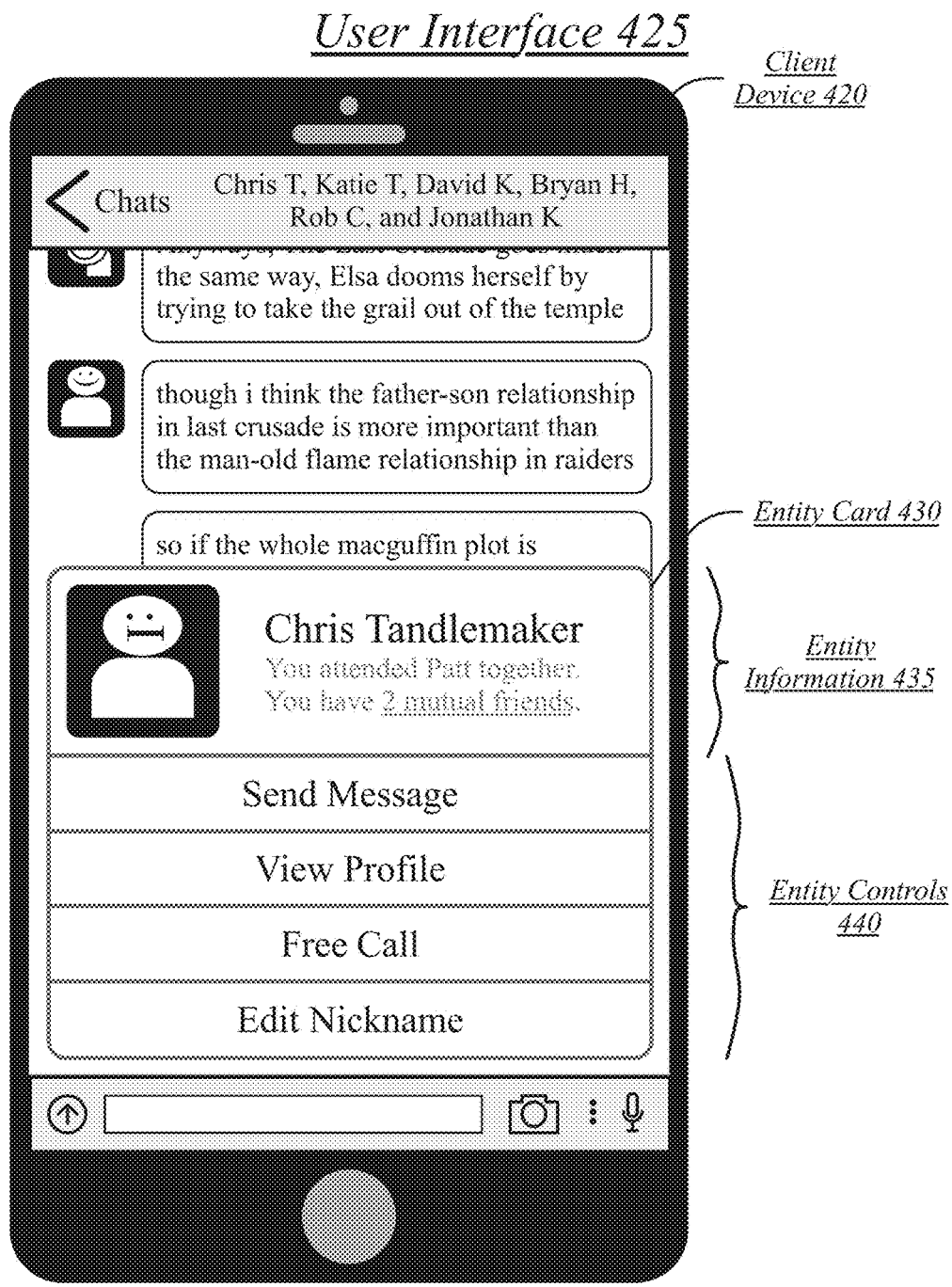
FIG. 4B illustrates an embodiment of a user interface with an entity card.

FIG. 4B illustrates an embodiment of a user interface 425 with an entity card 430.

In some embodiments, an entity card 430 may be displayed in response to a user selecting an entity reference display 405. For instance, the entity reference in a message may comprise an entity-card display control that, when selected, invokes the display of the entity card 430. In other embodiments, an entity card 430 may automatically be displayed as part of the entity reference display 420 for an entity reference, embedded within or appended to the message comprising the entity reference.

The entity card 430 may comprise a display of entity information 435 in an entity information display. The entity information 435 may include a name for the referenced entity, a picture for the referenced entity, relationship information for the referenced entity, connection information for the referenced, or any other type of information for the referenced entity.

The entity card 430 may comprise one or more entity controls 440. Entity controls 440 may empower a user to interact with the referenced entity in various ways. The entity controls 440 may include a message-send control, a profile-view control, a free-call control, an edit-nickname control, or any other type of control that may related to a referenced entity.

Figure 5:
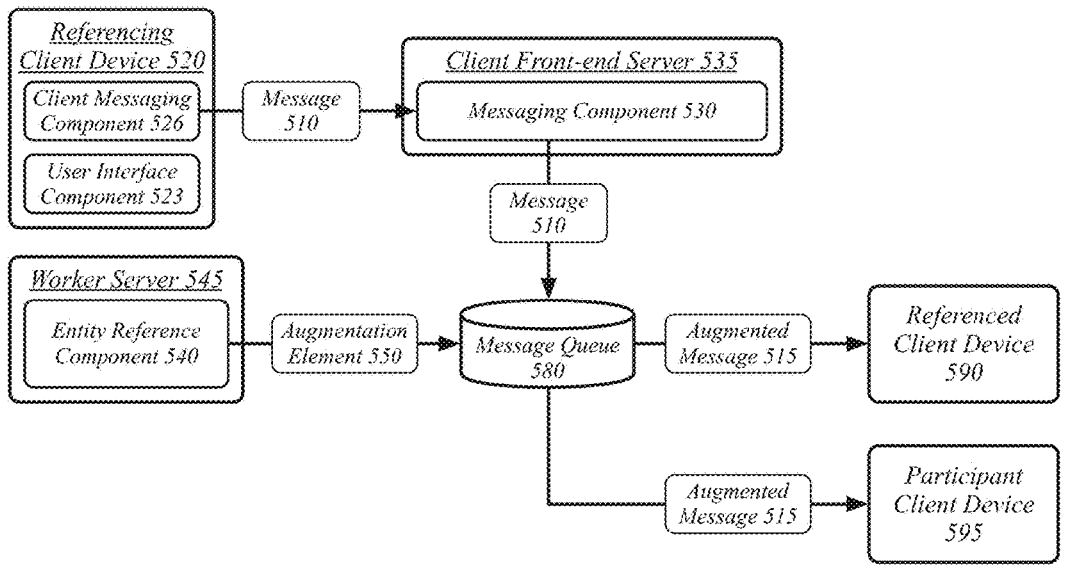
FIG. 5 illustrates an embodiment of an entity reference system processing a message into an augmented message with an augmentation element.

FIG. 5 illustrates an embodiment of an entity reference system 100 processing a message 510 into an augmented message 515 with an augmentation element 550.

A messaging system may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 535 may be interpreted as using the network interface controller for network access to a communications network for the transmission or reception of information.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535.

A client front-end server 535 may be generally arranged to act as a network access point to the messaging system for client devices such as a referencing client device 520. The client front-end server 535 may comprise a messaging component 530, the messaging component 530 generally arranged to act as a network access point to messaging services for the messaging system. The messaging component 530 may receive messages from client devices and add the messages to message queues.

A message queue 580 may be specifically associated with the user of the referencing client device 520, such as by being uniquely associated within the messaging system with a user account for the user of referencing client device 520. The message queue 580 may be a single queue used for all messaging endpoints used by this user. The message queue 580 may comprise a representation of updates in a strict linear order. The message queue 580 may be organized as a data unit according to a variety of techniques. The message queue 580 may be stored in semi-persistent memory, persistent storage, both semi-persistent memory and persistent storage, or a combination of the two. The message queue 580 may be organized according to a variety of data structures, including linked lists, arrays, and other techniques for organizing queues. The message queue 580 may generally comprise a first-in-first-out (FIFO) queue in which no update will be removed or retrieved from the queue before any updates that were received prior to it.

The messaging system may comprise one or more worker servers, such as worker server 545. In general, the messaging system may comprise a plurality of worker servers that may be assigned to various tasks. In some embodiments, worker servers may be dynamically reassigned to different tasks as load on the messaging system changes. A worker server 545 may comprise an entity reference component 540. The entity reference component 540 may be generally arranged to manage entity reference prediction, creation, and distribution on behalf of users of the entity reference system 100.

The user interface component 523 of the messaging client on a referencing client device 520 may receive user input from a user of the referencing client device 520. The user interface component 523 may predict an entity-reference invocation in a message thread display on the referencing client device 520. In some cases, the user interface component 523 may predict the entity-reference invocation in response to detecting an entity-reference invocation symbol in a text-entry field of the messaging client. In some cases, the user interface component 523 may predict the entity-reference invocation in response to detecting one of an entity name and a partial entity name in a text-entry field of the messaging client.

The user interface component 523 may suggest one or more entities for use in an entity-reference invocation in response to predicting the entity-reference invocation. The user interface component 523 may receive an entity text segment via a text-entry field and suggest the one or more entities based on the entity text segment. For instance, the entity reference system 100 may match the entity text segment against known entities, such as may be represented in a social graph 200 for a social-networking system. Matching entities may be selected and ranked according to context information for the messaging interaction in which the text segment was composed and the broader context for the composing user. The selecting and ranking may be performed via coordination between the user interface component 523 and the entity reference component 540. For instance, the user interface component 523 may iteratively update the entity reference component 540 once an entity-reference symbol is entered by the user, or when some other technique is used to predict an entity reference being invoked. An entity text segment may be created character-by-character by the user, with the suggested entities repeatedly updated as each character is received, refining the name-match results as a referenced entity is further defined by the user.

The one or more entities may comprise one or more or two or more of a user entity, a person entity, a messaging bot entity, an article entity, a media entity, a calendar event entity, and a place entity. A user entity may comprise a user of the messaging system. A person entity may comprise a person known to the entity reference system 100, which may include both users of the messaging system and non-users of the messaging system, such as celebrities or other well-known people. A messaging bot entity may comprise an automated program empowering access to information, products, services, or other operations. An article entity may correspond to, without limitation, a web article identified by a uniform resource locator (URL). A media entity may correspond to a media item, such as may be shared via the messaging system. A calendar event entity may correspond to an event recorded on a calendar, such as a calendar maintained by the messaging system. A place entity may correspond to a place, such as a location, as may include a business location, known to the messaging system.

The one or more entities may correspond to one or more user accounts for a social-networking system. The message thread display may be for a group message thread, where a group message thread comprises three or more participants. The one or more entities may comprise one or more user entities for messaging contacts for a user account for the referencing user. The one or more user entities may be ranked according to one or more of relationship information, messaging frequency, and referencing frequency. Relationship information may comprise information relating to one or more relationships that may exist between two or more users, such as, without limitation, a shared place of education or employment, specified registered interpersonal relationships (e.g., a registered friendship, a registered romantic relationship, a registered familiar relationship), or any other social relationship between users. Messaging frequency may represent the frequency with which two users message each other. Referencing frequency may represent the frequency with which the referencing user references the other user. An entity may be ranked higher—displayed more prominently—where these signals are more significant between the referencing user and the one or more contacts. Each of these signals may be represented numerically and combined using a function to produce a ranking score that is used to rank the contacts for display.

The one or more entities may comprise one or more user entities for participants in the group message thread, wherein in the one or more user entities are ranked according to one or more of relationship information, group-message-thread participation recency, messaging frequency, and referencing frequency. The group-message-thread participation recency may be a measure of how recently the participant participated in (i.e., submitted a message to) the group message thread. An entity may be ranked higher—displayed more prominently—where these signals are more significant between the referencing user and the one or more participants. Each of these signals may be represented numerically and combined using a function to produce a ranking score that is used to rank the participants for display. Both participants and contacts may be ranked with each other using their respective ranking scores. Some entities may be both contacts and participants, and as such may only be included once in the display of suggested entities.

In some embodiments, predicative learning may be used to rank suggested entities. The entity-reference invocation is associated with a invoking user account and the one or more entities are ranked according to predicative learning. The predicative learning may be based on an entity-reference history for the invoking user account. Various signals relating to the context of the entity-reference invocation may be gathered and used to rank the suggested entities based on a function combining the signals determined according to machine learning based on the entity-reference history for the invoking user account.

The client messaging component 526 receives the entity-reference invocation, the entity-reference invocation comprising an entity reference. This entity reference may correspond to one of the suggested entities. The client messaging component 526 then generates a message 510 comprising the entity reference sends the message to a messaging system, such as via the messaging component 530. The message 510 may reference the entity using an entity identifier, such as may be used to identify the entity in a social graph 200.

The messaging component 530 receives the message 510 from the referencing client device 520. The messaging component 530 determines a receiving user account for the message, such as based on a thread identifier and a registration of the participants in the message thread identified by the thread identifier. The messaging component 530 adds the message 510 to a message queue 580 for distribution to one or more other client devices 590, 595.

The entity reference component 540 selects an augmentation element 550 associated with the entity reference and generates an augmented entity reference by augmenting the entity reference with the augmentation element. The augmented entity reference produces an augmented message 515. In some embodiments, the augmentation element 550 may be provided to the referencing client device 520 so that the augmentation element can be included with the outgoing message 510 from the referencing client device 520. The augmentation element provides information and/or controls relating to the entity reference empowering richer interaction with the reference.

The messaging component 530 then sends the augmented entity reference to one or more receiving client devices associated with the receiving user account. The augmented message 515 may be sent to a referenced client device 590, the referenced client device 590 used by a user referenced by the entity reference. The augmented message may be sent to a participant client device 595, where the participant client device 595 is used by a participant in the message thread, whether or not the participant is mentioned by the entity reference. Where an entity reference is to someone or something other than a participant in the message thread, there may be no referenced client device 590. However, in some cases, a referenced user may be notified that they were referenced even where they are not a participant, such as where they are referenced in a public group message thread.

The entity reference component 540 may select the augmentation element 550 associated with the entity reference based on the entity reference being associated with a distinct entity from a receiving user entity for the receiving user account. A particular augmentation element 550, or plurality of augmentation elements, may be used where a recipient of the entity referenced isn't themselves being referenced. For instance, a control to add a referenced user as a friend or contact, or a control to message a referenced user, may be selectively used where the receiving user isn't themselves being referenced (to avoid a user being offered the option to message themselves). The entity reference component 540 may select the augmentation element 550 associated with the entity reference based on social-networking information for the receiving user account. For instance, one or more augmentation elements may be included that include relationship information between a referenced user and a receiving user. This social-networking information may only be used where the receiving user isn't themselves being referenced to avoid attempting to inform a user about themselves.

In some instances, the entity reference corresponding to an article entity, in response to which the entity reference component 540 may select an article preview for the article entity as the augmentation element 550. In some instances, the entity reference may correspond to a media entity, in response to which the entity reference component 540 may select a media preview for the media entity as the augmentation element 550.

In some instances, the entity reference corresponding to a location entity, in response to which the entity reference component 540 may select a location page preview as the augmentation element 550 and a map view as a second augmentation element. The entity reference component 540 generates the augmented entity reference by augmenting the entity reference with the augmentation element 550 and the second augmentation element.

In some instances, the entity reference may correspond to a user entity, in response to which the entity reference component 540 may select one or more user information items as the augmentation element 550. The one or more user information items may comprise one or more of a user name for the user entity, a user nickname for the user entity, a profile item for the user entity, a user page item for the user entity, a user relationship indicator for the user entity, a user connection for the user entity, and a user association for the user entity. A user nickname may be customized by another user as a personal identifier for the user. A profile item for a user entity may comprise, for example, a photo of the user. A user relationship may comprise a registered relationship with a user, such as a friendship or romantic relationship. A user connection may comprise a common friend of the receiving user and the referenced user, or a counter of the number of common friends between the receiving user and the referenced user. A user association of the user entity may comprise, without limitation, a place of employment, a place of education, or any other associations a user may have.

In some cases, the entity reference may correspond to a user entity. In response, the entity reference component 540 may select one or more user controls as the augmentation element 550. The one or more user controls may comprise one or more of a group-invitation control, a contact-add control, a friend-add control, a message-composition control, a view-profile control, an audio call control, a nickname-editing control, and a reply-to control. A group-invitation control may empower inviting a referenced user to a group message thread. A contact-add control may empower adding a referenced user as a contact with the messaging system. A friend-add control may empower adding a user as a friend with a social-networking system. A message-composition control may empower the composition of a message to the referenced user in a one-on-one message thread. A view-profile control may empower the viewing of a profile for the referenced user. An audio-call control may empower the initiation of an audio call to the referenced user. A nickname-editing control may empower the setting of a nickname for the referenced user. A reply-to control may empower the sending of a reply message in the message thread in reply to the message 510 referencing the referenced user. Other controls may be used, without limitation.

The message 510 may be associated with a message thread. The entity reference component 540 may select the one or more user information items in response to one of the message being a first reference for the entity reference for the message thread and a reference-recency for the entity reference for the message thread exceeding a predefined threshold. As such, an entity reference may only be augmented with additional information or controls where the referenced entity hasn't recently been referenced in the message thread according to a predefined threshold for recency.

A client messaging component 526 on a recipient client device may receive the augmented message 515. The recipient client device is associated with a recipient user account. The message 515 message comprising the entity reference. The augmented message 515 is addressed to a message thread, with the recipient user account a participant in the message thread. The user interface component 523 on the recipient client device extracts an augmentation element 550 for the entity reference from the message and displays the augmentation element 550 in a message thread display for the message thread on the recipient client device. In some cases, the entity reference may be associated with the recipient user account, such as by referencing the user of the recipient client device. In these cases, the recipient client device corresponds to the referenced client device 590.

In some embodiments, the messaging component 530 may increase a messaging coefficient between the recipient user account and a sender user account in response to the sender user account sending the augmented message 515 comprising the entity reference to the recipient user account. The messaging coefficient reflects a determined messaging relationship between two users, which may be used, without limitation, to recommend users to each other for messaging, referencing, or other tasks. In general, mutual participation in a group message thread may increase the messaging coefficient between two user accounts, such as by a defined mutual-participation amount. The increase to the messaging coefficient for a reference may be higher than for mutual participation, so as to reflect the greater implied relationship of one user referencing another than mere mutual participation in a group message thread.

The user interface component 523 may position the message thread display at the augmentation element 550 based on the entity reference being associated with the recipient user account. For instance, where a message thread display is opened on the recipient client device, the message thread display may be automatically scrolled to display the augmented message 515 and its augmentation element 550.

The user interface component 523 may display a mention-navigation control in association with the message thread display. The mention-navigation control empowers navigation between one or more of entity references to the recipient user account, so as to allow a user to skip through a message thread to mentions of themselves. In some embodiments, the mention-navigation control also empowers navigation to text segments corresponding to one or more names for the recipient user account, such that the mention-navigation control empowers navigation between one or more of entity references to the recipient user account and the text segments corresponding to one or more names for the recipient user account. The user may therefore skip through a message thread to all mentions of themselves, whether formalized as entity references or not. The one or more names may comprise a real name and one or more nicknames. The one or more nicknames may be drawn from one or more client devices. As such, nicknames assigned by a plurality of users for use on a plurality of client devices may be sent to the referenced client device 590 so that the user interface component 523 can navigate between mentions that are based on the various nicknames different users may have for the referenced user.

Notifications may be used to notify users that they have been mentioned. The referenced client device 590 may receive a notification for the augmented message 515 from the messaging system, the notification for the message indicating that the entity reference is associated with the recipient user account. The notification for the augmented message 515 may indicate that the entity reference is associated with the recipient user account based on one or more of an entity-reference-specific text segment, an entity-reference-specific icon, an entity-reference-specific sound, and an entity-reference-specific haptic signal.

In some cases, the message thread is a public group message thread, wherein the notification is received in response to recipient user account being mentioned in the public group message thread. This notification may be done even where the referenced user isn't a participant in the public group message thread. This may be selectively done only where the group message thread is a public group message thread and not for private group message threads, so as to avoid notifying users that they have been mentioned in a message thread to which they don't have access.

A display of a group message thread in an inbox view may include a preview of the contents of the message thread. In some cases, a most-recent message for the message thread may be used for the preview of the message thread. However, where a user has a reference to them in the message thread, or specifically where a user has an unread reference to them in the message thread, a preview of the message 510 including the entity reference may be used as the preview of the message thread even where the message 510 including the reference to the user is not the most-recent message. As such, the use of a message 510 with an entity reference may be selectively be used as the message thread preview where the entity reference is a reference to the viewing user even where the entity reference is not part of the most-recent message for the message thread.

Some users may wish to deactivate notification for a group message thread, for example, without limitation, a particular busy group message thread that they aren't particularly active in. However, such users may still desire to be notified if they are specifically mentioned in the group message thread. This may aid the user in learning when a group message thread has become more relevant to them. This may aid other participants in the group message thread in drawing a participant back to the message thread. As such, the user interface component 523 may receive a notification-deactivation command in association with the message thread, display a reference-notification dialog in response to the notification-deactivation command, receive a user command in response to the reference-notification dialog, and display the notification where the user command indicates reference notification. In some embodiments, notification management may be performed by the messaging servers of the messaging system, such that the user interface component notifies the messaging servers to only send notifications for the group message thread where they contain references to the user.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6A:
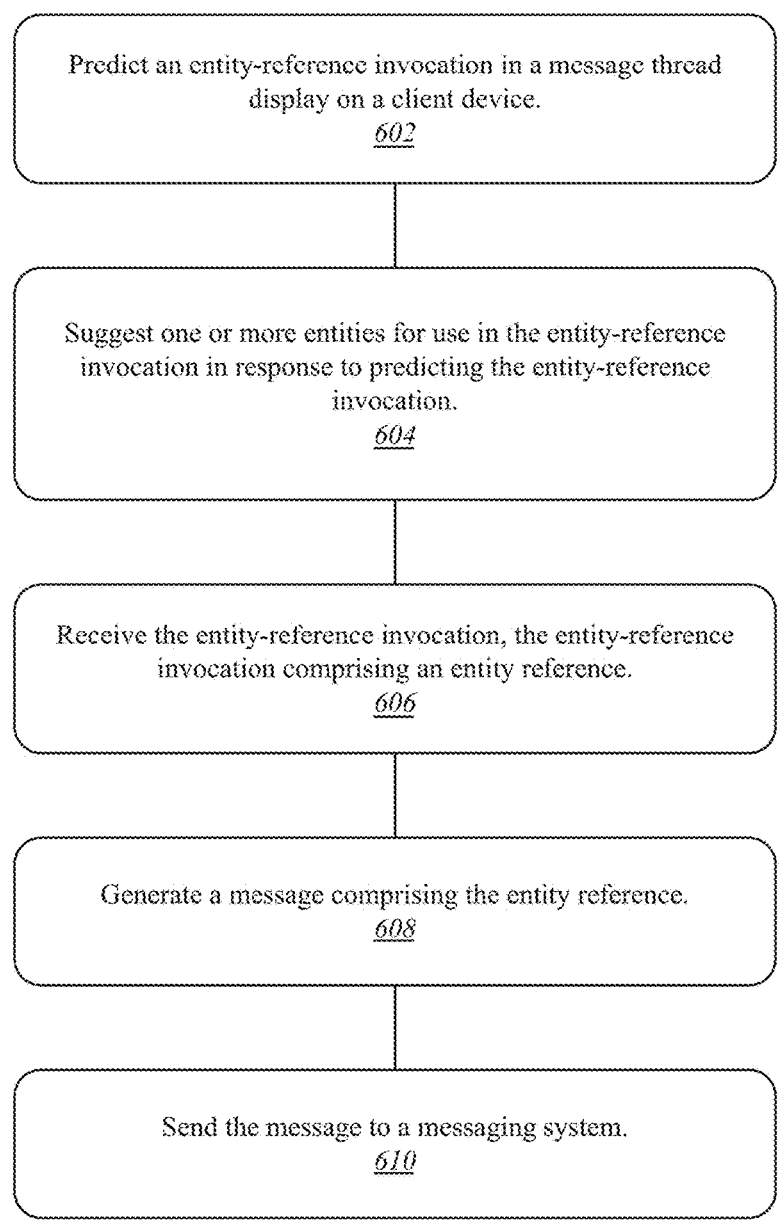
FIG. 6A illustrates an embodiment of a first logic flow for the system of FIG. 1.

FIG. 6A illustrates one embodiment of a logic flow 600. The logic flow 600 may be representative of some or all of the operations executed by one or more embodiments described herein.

In the illustrated embodiment shown in FIG. 6A, the logic flow 600 may predict an entity-reference invocation in a message thread display on a client device at block 602.

The logic flow 600 may suggest one or more entities for use in the entity-reference invocation in response to predicting the entity-reference invocation at block 604.

The logic flow 600 may receive the entity-reference invocation, the entity-reference invocation comprising an entity reference at block 606.

The logic flow 600 may generate a message comprising the entity reference at block 608.

The logic flow 600 may send the message to a messaging system at block 610.

Figure 6B:
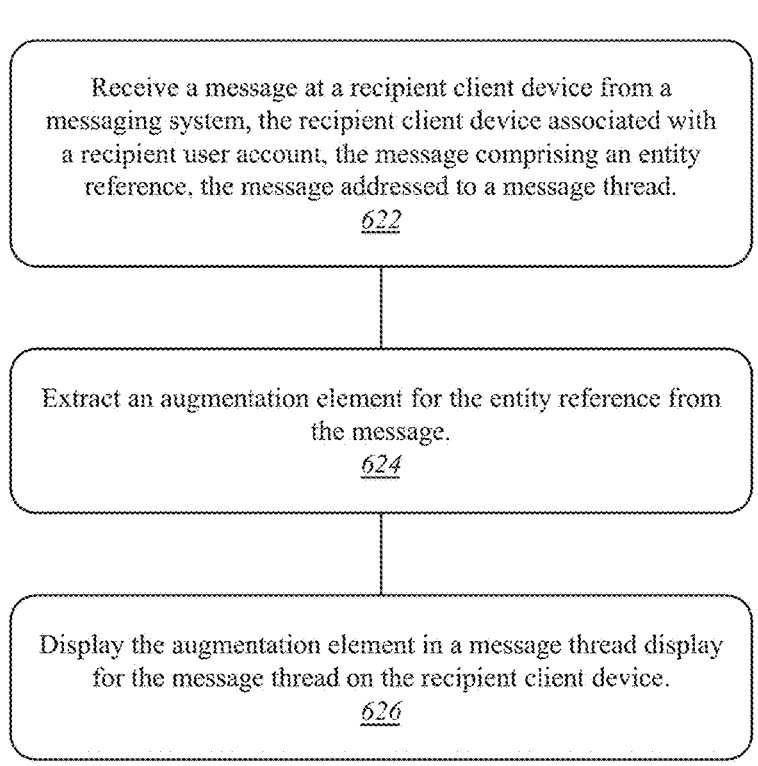
FIG. 6B illustrates an embodiment of a second logic flow for the system of FIG. 1.

FIG. 6B illustrates one embodiment of a logic flow 620. The logic flow 620 may be representative of some or all of the operations executed by one or more embodiments described herein.

In the illustrated embodiment shown in FIG. 6B, the logic flow 620 may receive a message at a recipient client device from a messaging system, the recipient client device associated with a recipient user account, the message comprising an entity reference, the message addressed to a message thread at block 622.

The logic flow 620 may extract an augmentation element for the entity reference from the message at block 624.

The logic flow 620 may display the augmentation element in a message thread display for the message thread on the recipient client device at block 626.

Figure 6C:
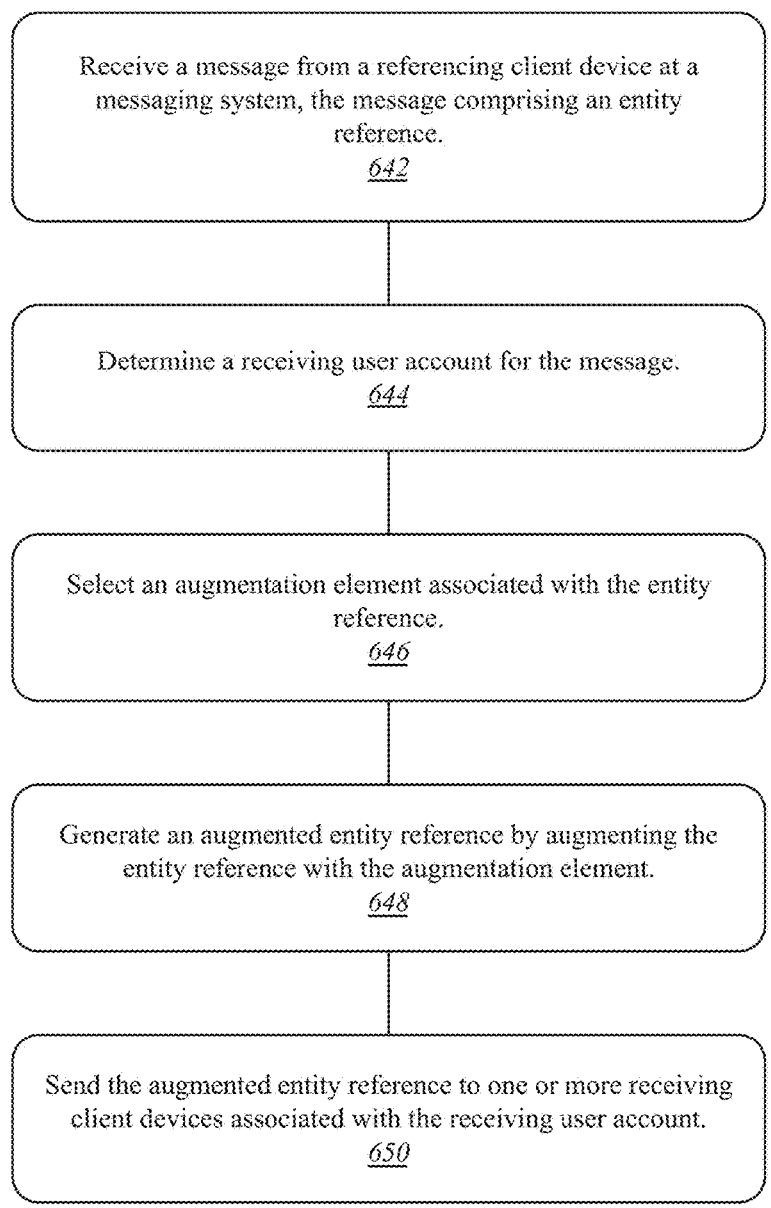
FIG. 6C illustrates an embodiment of a third logic flow for the system of FIG. 1.

FIG. 6C illustrates one embodiment of a logic flow 640. The logic flow 640 may be representative of some or all of the operations executed by one or more embodiments described herein.

In the illustrated embodiment shown in FIG. 6C, the logic flow 640 may receive a message from a referencing client device at a messaging system, the message comprising an entity reference at block 642.

The logic flow 640 may determine a receiving user account for the message at block 644.

The logic flow 640 may select an augmentation element associated with the entity reference at block 646.

The logic flow 640 may generate an augmented entity reference by augmenting the entity reference with the augmentation element at block 648.

The logic flow 640 may send the augmented entity reference to one or more receiving client devices associated with the receiving user account at block 650.

The embodiments are not limited to these examples.

Figure 7:
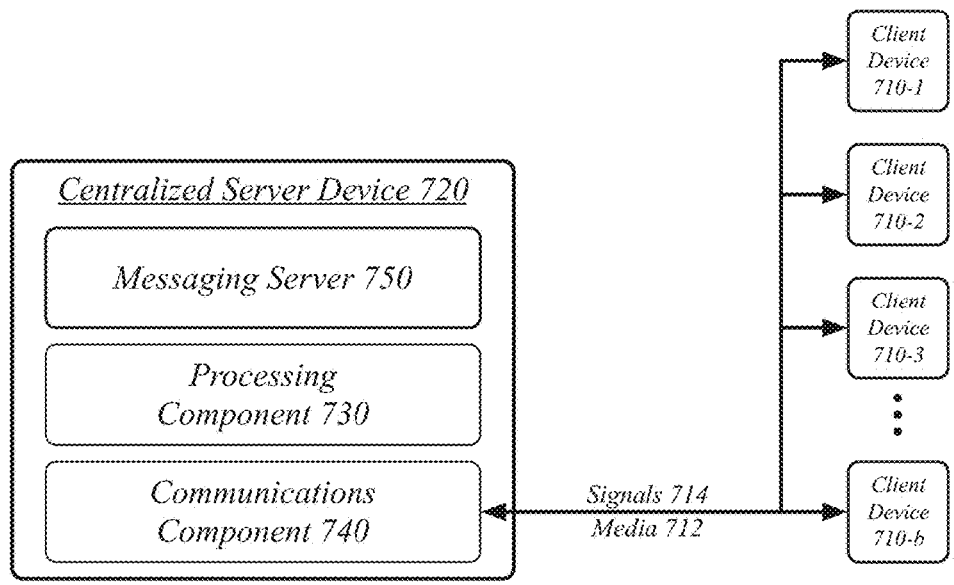
FIG. 7 illustrates an embodiment of a centralized system for the system of FIG. 1.

FIG. 7 illustrates a block diagram of a centralized system 700. The centralized system 700 may implement some or all of the structure and/or operations for the entity reference system 100 in a single computing entity, such as entirely within a single centralized server device 720.

The centralized server device 720 may comprise any electronic device capable of receiving, processing, and sending information for the messaging flow visualization media distribution system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the entity reference system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the entity reference system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation.

The centralized server device 720 may execute a messaging server 750. The messaging server 750 may comprise a messaging server for a messaging system. The messaging server 750 may provide messaging operations for a plurality of client devices 710, receiving and sending messages between the client devices 710. The client devices 710 may correspond to one or more of a smartphone device 150, tablet device 160, personal computer device 170, and/or any other client device.

Figure 8:
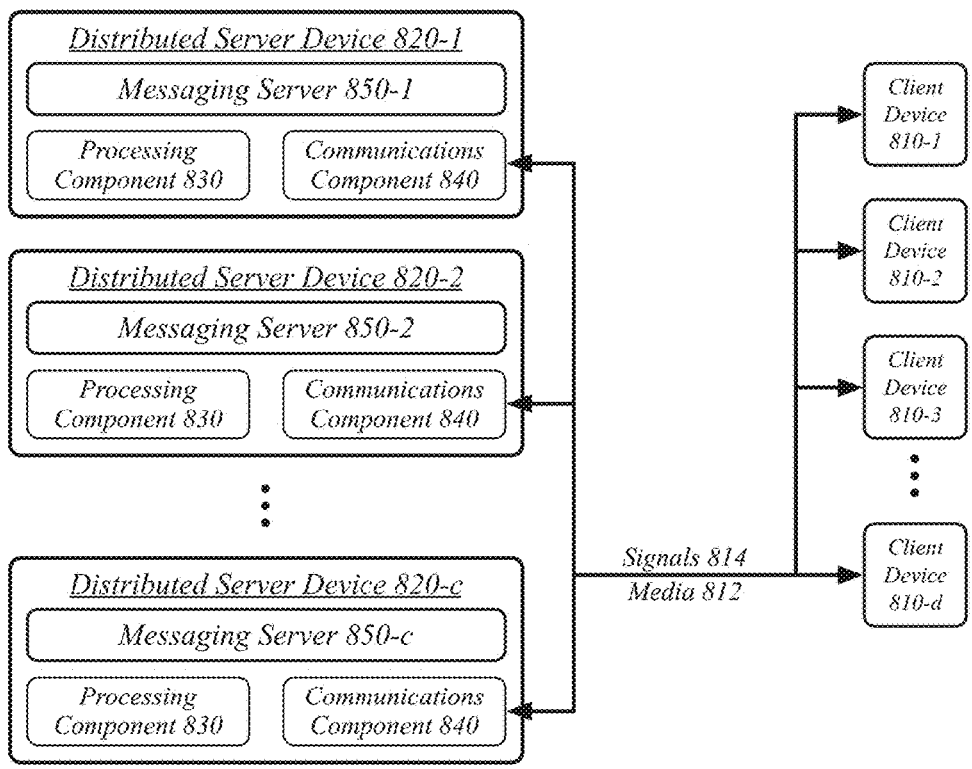
FIG. 8 illustrates an embodiment of a distributed system for the system of FIG. 1.

FIG. 8 illustrates a block diagram of a distributed system 800. The distributed system 800 may distribute portions of the structure and/or operations for the entity reference system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 820. In general, the distributed server devices 820 may be the same or similar to the centralized server device 720 as described with reference to FIG. 7. For instance, the distributed server devices 820 may each comprise a processing component 830 and a communications component 840 which are the same or similar to the processing component 730 and the communications component 740, respectively, as described with reference to FIG. 7. In another example, the distributed server devices 820 may communicate over a communications media 812 using communications signals 814 via the communications components 840.

The distributed server devices 820 may comprise or employ one or more server programs that operate to perform various methodologies in accordance with the described embodiments. In one embodiment, for example, the distributed server devices 820 may each execute one of a plurality of messaging servers 850. The messaging servers 850 may comprise messaging servers for a messaging system 110. The messaging servers 850 may provide messaging operations for a plurality of client devices 810, receiving and sending messages between the client devices 810. The client devices 810 may correspond to one or more of a smartphone device 150, tablet device 160, personal computer device 180, and/or any other client device.

Figure 9:
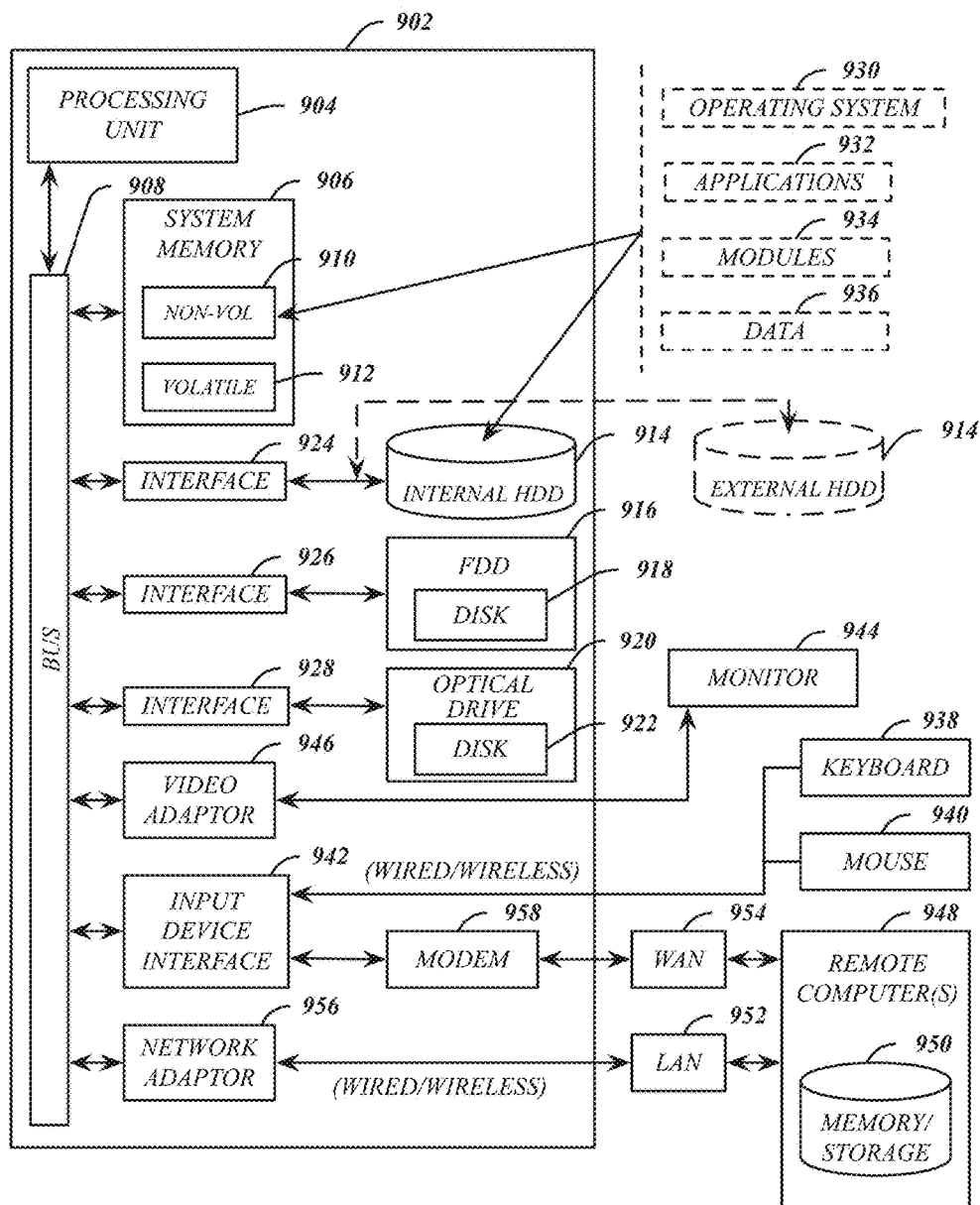
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the media distribution system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
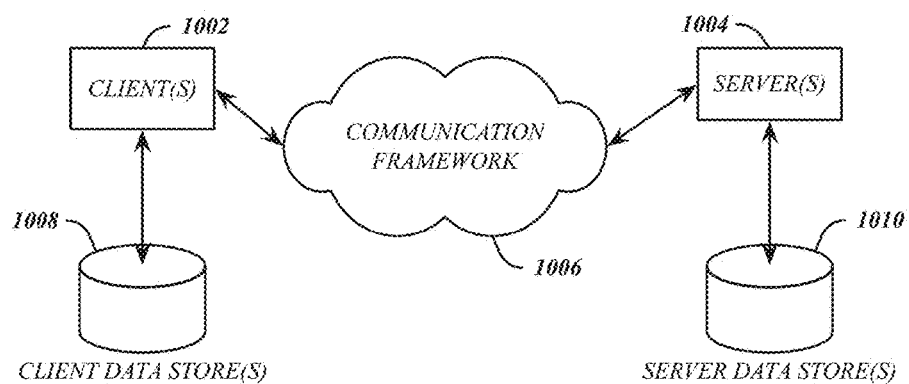
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the messaging clients of various client devices. The servers 1004 may implement messaging servers 110. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
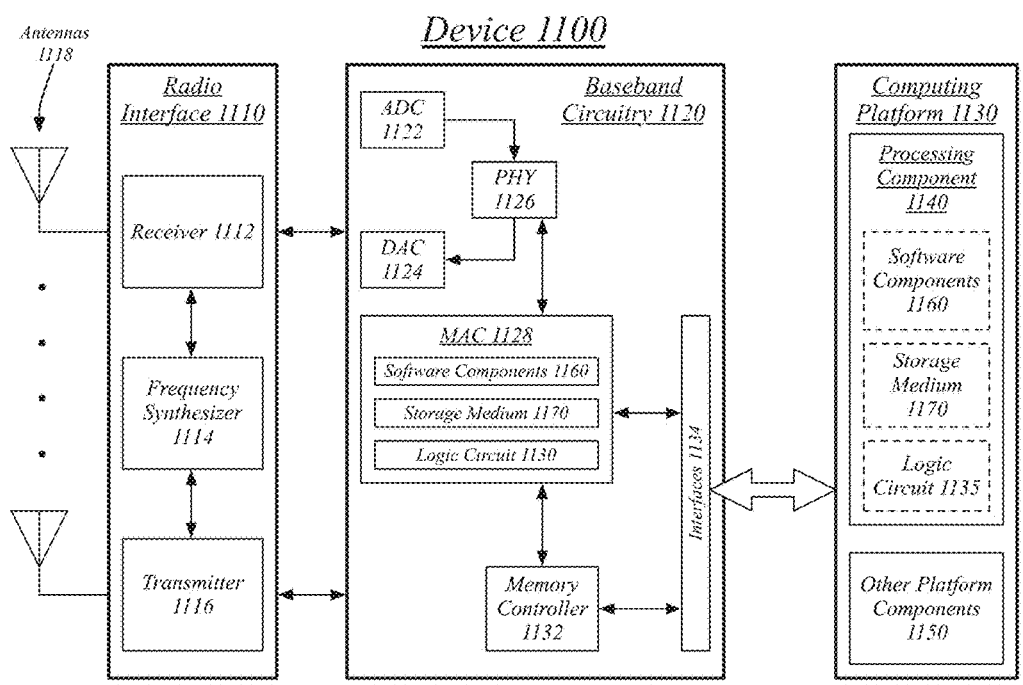
FIG. 11 illustrates an embodiment of a radio device architecture.

FIG. 11 illustrates an embodiment of a device 1100 for use in a multicarrier OFDM system, such as the media distribution system 100. Device 1100 may implement, for example, software components 1160 as described with reference to media distribution system 100 and/or a logic circuit 1135. The logic circuit 1135 may include physical circuits to perform operations described for the media distribution system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the media distribution system 100 and/or logic circuit 1135 in a single computing entity, such as entirely within a single device. Alternatively, the device 1100 may distribute portions of the structure and/or operations for the media distribution system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the media distribution system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise predicting an entity-reference invocation in a message thread display on a client device; suggesting one or more entities for use in the entity-reference invocation in response to predicting the entity-reference invocation; receiving the entity-reference invocation, the entity-reference invocation comprising an entity reference; generating a message comprising the entity reference; and sending the message to a messaging system.

A computer-implemented method may further comprise the one or more entities comprising two or more of a user entity, a messaging bot entity, an article entity, a media entity, a calendar event entity, and a place entity.

A computer-implemented method may further comprise predicting the entity-reference invocation in response to detecting an entity-reference invocation symbol in a text-entry field.

A computer-implemented method may further comprise predicting the entity-reference invocation in response to detecting one of an entity name and a partial entity name in a text-entry field.

A computer-implemented method may further comprise receiving an entity text segment; and suggesting the one or more entities based on the entity text segment.

A computer-implemented method may further comprise the message thread display for a group message thread, the one or more entities comprising one or more user entities for messaging contacts, wherein in the one or more user entities are ranked according to one or more of relationship information, messaging frequency, and referencing frequency.

A computer-implemented method may further comprise the message thread display for a group message thread, the one or more entities comprising one or more user entities for participants in the group message thread, wherein in the one or more user entities are ranked according to one or more of relationship information, group-message-thread participation recency, messaging frequency, and referencing frequency.

A computer-implemented method may further comprise the one or more entities corresponding to one or more user accounts for a social-networking system.

A computer-implemented method may further comprise the entity-reference invocation associated with a invoking user account, the one or more entities ranked according to predicative learning, the predicative learning based on an entity-reference history for the invoking user account.

An apparatus may comprise a processor circuit on a device; a user interface component operative on the processor circuit to predict an entity-reference invocation in a message thread display on a client device; suggest one or more entities for use in the entity-reference invocation in response to predicting the entity-reference invocation; and receive the entity-reference invocation, the entity-reference invocation comprising an entity reference; a client messaging component operative on the processor circuit to generate a message comprising the entity reference; and send the message to a messaging system. The apparatus may be operative to implement any of the computer-implemented methods described herein.

A computer-implemented method may comprise receiving a message at a recipient client device from a messaging system, the recipient client device associated with a recipient user account, the message comprising an entity reference, the message addressed to a message thread; extracting an augmentation element for the entity reference from the message; and displaying the augmentation element in a message thread display for the message thread on the recipient client device.

A computer-implemented method may further comprise the entity reference associated with the recipient user account.

A computer-implemented method may further comprise increasing a messaging coefficient between the recipient user account and a sender user account in response to the sender user account sending the message comprising the entity reference to the recipient user account.

A computer-implemented method may further comprise positioning the message thread display at the augmentation element based on the entity reference being associated with the recipient user account.

A computer-implemented method may further comprise displaying a mention-navigation control in association with the message thread display.

A computer-implemented method may further comprise the mention-navigation control empowering navigation between one or more of entity references to the recipient user account and text segments corresponding to one or more names for the recipient user account.

A computer-implemented method may further comprise the one or more names comprising a real name and one or more nicknames, wherein the one or more nicknames are drawn from one or more client devices.

A computer-implemented method may further comprise receiving a notification for the message from the messaging system, the notification for the message indicating that the entity reference is associated with the recipient user account.

A computer-implemented method may further comprise the message thread a public group message thread, wherein the notification is received in response to recipient user account being mentioned in the public group message thread.

A computer-implemented method may further comprise the notification for the message indicating that the entity reference is associated with the recipient user account based on one or more of an entity-reference-specific text segment, an entity-reference-specific icon, an entity-reference-specific sound, and an entity-reference-specific haptic signal.

A computer-implemented method may further comprise receiving a notification-deactivation command in association with the message thread; displaying a reference-notification dialog in response to the notification-deactivation command; receiving a user command in response to the reference-notification dialog; and displaying the notification where the user command indicates reference notification.

An apparatus may comprise a processor circuit on a device; a client messaging component operative on the processor circuit to receive a message at a recipient client device from a messaging system, the recipient client device associated with a recipient user account, the message comprising an entity reference, the message addressed to a message thread; and extract an augmentation element for the entity reference from the message; and a user interface component operative on the processor circuit to display the augmentation element in a message thread display for the message thread on the recipient client device. The apparatus may be operative to implement any of the computer-implemented methods described herein.

A computer-implemented method may comprise receiving a message from a referencing client device at a messaging system, the message comprising an entity reference; determining a receiving user account for the message; selecting an augmentation element associated with the entity reference; generating an augmented entity reference by augmenting the entity reference with the augmentation element; and sending the augmented entity reference to one or more receiving client devices associated with the receiving user account.

A computer-implemented method may further comprise selecting the augmentation element associated with the entity reference based on the entity reference being associated with a distinct entity from a receiving user entity for the receiving user account.

A computer-implemented method may further comprise selecting the augmentation element associated with the entity reference based on social-networking information for the receiving user account.

A computer-implemented method may further comprise the entity reference corresponding to an article entity, further comprising: selecting an article preview for the article entity as the augmentation element.

A computer-implemented method may further comprise the entity reference corresponding to a media entity, further comprising: selecting a media preview for the media entity as the augmentation element.

A computer-implemented method may further comprise the entity reference corresponding to a location entity, further comprising: selecting a location page preview as the augmentation element and a map view as a second augmentation element; and generating the augmented entity reference by augmenting the entity reference with the augmentation element and the second augmentation element.

A computer-implemented method may further comprise the entity reference corresponding to a user entity, further comprising: selecting one or more user information items as the augmentation element, the one or more user information items comprising one or more of a user name for the user entity, a user nickname for the user entity, a profile item for the user entity, a user page item for the user entity, a user relationship indicator for the user entity, a user connection for the user entity, and a user association for the user entity.

A computer-implemented method may further comprise the message associated with a message thread, further comprising: selecting the one or more user information items in response to one of the message being a first reference for the entity reference for the message thread and a reference-recency for the entity reference for the message thread exceeding a predefined threshold.

A computer-implemented method may further comprise the entity reference corresponding to a user entity, further comprising: selecting one or more user controls as the augmentation element, the one or more user controls comprising one or more of a group-invitation control, a contact-add control, a friend-add control, a message-composition control, a view-profile control, an audio call control, a nickname-editing control, and a reply-to control.

An apparatus may comprise a processor circuit on a device; a messaging component operative on the processor circuit to receive a message from a referencing client device at a messaging system, the message comprising an entity reference; determine a receiving user account for the message; and send an augmented entity reference to one or more receiving client devices associated with the receiving user account; and an entity reference component operative to select an augmentation element associated with the entity reference; and generate the augmented entity reference by augmenting the entity reference with the augmentation element. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a partial entity-reference invocation in a message thread display on a client device in response to detecting an entity-reference invocation symbol in a text-entry field;
   suggesting, based on the partial entity reference invocation, one or more entity-reference invocations referencing entities not participating in the messaging interaction;
   receiving a user selection of one of the one or more suggested entity-reference invocations;
   generating a message to the entity referenced in the selected entity-reference invocation; and
   sending the message to a messaging system.

2. The method of claim 1, the one or more suggested entity-reference invocations referencing two or more of a user entity, a messaging bot entity, an article entity, a media entity, a calendar event entity, and a place entity.

3. The method of claim 1, further comprising:
   receiving the partial entity-reference invocation in response to detecting one of an entity name and a partial entity name in a text-entry field.

4. The method of claim 1, the message thread display for a group message thread, the one or more suggested entity-reference invocations referencing one or more user entities, wherein in the one or more user entities are ranked according to one or more of relationship information, group-message-thread participation recency, messaging frequency, and referencing frequency.

5. The method of claim 1, the entity-reference invocation associated with an invoking user account, the one or more suggested entity-reference invocations ranked according to predicative learning, the predicative learning based on an entity-reference history for the invoking user account.

6. An apparatus, comprising:
   a processor circuit on a device;
   a user interface component operative on the processor circuit to:
   receive a partial entity-reference invocation in a message thread display on a client device in response to detecting an entity-reference invocation symbol in a text-entry field;
   suggest, based on the partial entity-reference invocation, one or more entity-reference invocations referencing entities not participating in the messaging interaction; and
   receive a user selection of one of the one or more suggested entity-reference invocations; and
   a client messaging component operative on the processor circuit to:
   generate a message to the entity referenced in the selected entity-reference invocation; and
   send the message to a messaging system.

7. The apparatus of claim 6, the one or more suggested entity-reference invocations referencing two or more of a user entity, a messaging bot entity, an article entity, a media entity, a calendar event entity, and a place entity.

8. The apparatus of claim 6, further comprising:
   the user interface component operative to receive the partial entity-reference invocation in response to detecting one of an entity name and a partial entity name in a text-entry field.

9. The apparatus of claim 6, the message thread display for a group message thread, the one or more suggested entity-reference invocations referencing one or more user entities, wherein in the one or more user entities are ranked according to one or more of relationship information, group-message-thread participation recency, messaging frequency, and referencing frequency.

10. The apparatus of claim 6, the entity-reference invocation associated with an invoking user account, the one or more suggested entity-reference invocations ranked according to predicative learning, the predicative learning based on an entity-reference history for the invoking user account.

11. At least one non-transitory computer-readable storage medium comprising instructions that, when executed, cause a system to:
    receive a partial entity-reference invocation in a message thread display on a client device in response to detecting an entity-reference invocation symbol in a text-entry field;
    suggest, based on the partial entity reference invocation, one or more entity-reference invocations referencing entities not participating in the messaging interaction;

receive a user selection of one of the one or more suggested entity-reference invocations;

generate a message to the entity referenced in the selected entity-reference invocation; and send the message to a messaging system.

12. The computer-readable storage medium of claim 11, the one or more suggested entity-reference invocations referencing two or more of a user entity, a messaging bot entity, an article entity, a media entity, a calendar event entity, and a place entity.

13. The computer-readable storage medium of claim 11, comprising further instructions that, when executed, cause a system to:

receive the partial entity-reference invocation in response to detecting one of an entity name in the text-entry field and a partial entity name in the text-entry field.

14. The computer-readable storage medium of claim 11, the message thread display for a group message thread, the one or more suggested entity-reference invocations referencing one or more user entities, wherein in the one or more user entities are ranked according to one or more of relationship information, group-message-thread participation recency, messaging frequency, and referencing frequency.

15. The computer-readable storage medium of claim 11, the entity-reference invocation associated with an invoking user account, the one or more suggested entity-reference invocations ranked according to predicative learning, the predicative learning based on an entity-reference history for the invoking user account.

* * * * *